(12) United States Patent
Arslanturk et al.

(10) Patent No.: US 11,125,146 B2
(45) Date of Patent: *Sep. 21, 2021

(54) SYSTEMS AND METHODS FOR DIAGNOSING A THERMOSTAT

(71) Applicant: Cummins Inc., Columbus, IN (US)

(72) Inventors: Emrah Arslanturk, Columbus, IN (US); Jeremy Nethercutt, Morgantown, IN (US)

(73) Assignee: Cummins, Inc., Columbus, IN (US)

( * ) Notice: Subject to any disclaimer, the term of this patent is extended or adjusted under 35 U.S.C. 154(b) by 158 days.

This patent is subject to a terminal disclaimer.

(21) Appl. No.: 16/415,346

(22) Filed: May 17, 2019

(65) Prior Publication Data

US 2019/0271259 A1 Sep. 5, 2019

Related U.S. Application Data (63) Continuation of application No. 14/871,207, filed on Sep. 30, 2015, now Pat. No. 10,294,853.

(Continued)

(51) Int. Cl.
| | |
|---|---|
| *F01P 11/16* | (2006.01) |
| *F02M 26/47* | (2016.01) |
| *F01N 3/10* | (2006.01) |
| *F01N 3/20* | (2006.01) |
| *F01N 3/021* | (2006.01) |

(Continued)

(52) U.S. Cl.
CPC .............. *F01P 11/16* (2013.01); *F01N 3/021* (2013.01); *F01N 3/106* (2013.01); *F01N 3/2066* (2013.01); *F01P 2025/32* (2013.01); *F01P 2031/32* (2013.01); *F02B 29/0406* (2013.01); *F02M 26/05* (2016.02); *F02M 26/23* (2016.02); *F02M 26/47* (2016.02)

(58) Field of Classification Search
CPC .......... F01P 7/16; F01P 11/16; F01P 2025/32; F02B 29/0406; F02M 26/05; F02M 26/23; F02M 26/47; F01N 3/106; F01N 3/2066; F01N 3/021

See application file for complete search history.

(56) References Cited

U.S. PATENT DOCUMENTS

6,321,695 B1 * 11/2001 Yoo ........................ F01P 11/16
123/198 D
6,532,808 B1 3/2003 Matsumoto et al.
(Continued)

*Primary Examiner* — Grant Moubry
(74) *Attorney, Agent, or Firm* — Foley & Lardner LLP (57) ABSTRACT

Systems and methods are disclosed for determining a temperature of a coolant in a cooling system for an engine and diagnosing a thermostat in the engine responsive to the determined temperature. A system includes a liquid cooling system including a thermostat, the liquid cooling system structured to circulate a coolant, and a controller coupled to the liquid cooling system and the EGR system. The controller is structured to: receive engine heat data indicative of a first amount of heat introduced into an engine; receive heat loss data indicative of an amount of heat loss experienced by the coolant; determine a temperature of the coolant based on the first amount of heat and the amount of heat loss; compare the determined temperature of the coolant to a sensed temperature of the coolant; and determine a status of the thermostat responsive to the comparison.

16 Claims, 4 Drawing Sheets

Related U.S. Application Data

(60) Provisional application No. 62/158,284, filed on May 7, 2015.

(51) Int. Cl.
    *F02B 29/04*     (2006.01)
    *F02M 26/05*     (2016.01)
    *F02M 26/23*     (2016.01)

(56) References Cited

U.S. PATENT DOCUMENTS

| | | |
|---|---|---|
| 6,752,011 B2 | 6/2004 | Matsumoto et al. |
| 7,921,705 B2 | 4/2011 | Hamama et al. |
| 8,046,150 B2 | 10/2011 | Anilovich et al. |
| 8,370,052 B2 | 2/2013 | Lin et al. |
| 8,479,569 B2 | 7/2013 | Sugimoto |
| 8,573,163 B2 | 11/2013 | Kinomura et al. |
| 9,097,172 B2 | 8/2015 | Washburn |
| 9,103,266 B2 | 8/2015 | Kim |
| 9,146,176 B2 | 9/2015 | Nishi |
| 9,200,581 B2 | 12/2015 | Bilancia et al. |
| 2004/0210361 A1* | 10/2004 | Na .................. G01M 15/048 701/31.4 |
| 2008/0202452 A1* | 8/2008 | Wakahara .............. G01K 15/00 123/41.15 |
| 2011/0251825 A1 | 10/2011 | Nagoshi |
| 2013/0058373 A1* | 3/2013 | Sakurada ............ F02D 41/1446 374/4 |
| 2013/0228228 A1 | 9/2013 | Akahane et al. |
| 2013/0253758 A1 | 9/2013 | Nishi |

\* cited by examiner

SYSTEMS AND METHODS FOR DIAGNOSING A THERMOSTAT

CROSS-REFERENCE TO RELATED PATENT APPLICATIONS

This application is a continuation of U.S. patent application Ser. No. 14/871,207, filed Sep. 30, 2015, which claims the benefit of and priority to U.S. Provisional Patent Application No. 62/158,284, filed May 7, 2015, both of which are incorporated herein by reference in their entireties.

BACKGROUND

Internal combustion engines utilize combustion to generate mechanical power. However, the combustion generates heat that can adversely impact the structure of the engine and surrounding components if the heat is not properly dissipated. Accordingly, internal combustion engines are either air-cooled or liquid-cooled. Air-cooled engines used to be prevalent before the technological advancements that have paved the way for liquid-cooling. In liquid-cooled engines, the liquid (e.g., coolant) is expected to operate within some nominal range to ensure stable combustion performance and prevent component failure. If the coolant is too cold, a variety of operational problems can occur such as incomplete combustion, power output losses, and an oil viscosity that is too dense or heavy to provide adequate lubrication in the engine. If the coolant is too hot (e.g., above the nominal range), another set of operational problems can occur such as premature combustion and a degradation of part-tolerances. To maintain the coolant within the nominal temperature range, a thermostat is employed in the cooling system for the engine.

The thermostat regulates the cooler limit of this nominal operation range when put in series with a coolant-to-air heat exchanger (commonly referred to as a radiator). Combustion itself provides the energy to allow the system to attain ideal temperature operation. On-Board-Diagnostics are typically used to identify failure of the thermostat, which may result in an indicator lamp on a dashboard of the vehicle. To date, a challenging application exists in systems which employ large heat exchangers which are not isolated by mechanical thermostats. Urban on-highway bus applications exemplify this scenario, where large capacity coolant-to-cabin air heat exchangers are employed to heat the passenger cabin in cold weather. Because this heat exchange causes coolant temperature to mimic the signature of a system with a failed-open thermostat, current diagnostics are incapable of distinguishing this scenario from a hardware failure. It is desirable to repair a failed thermostat to prevent system damage and degradation in performance.

SUMMARY

One embodiment relates to an apparatus for determining a temperature of coolant in a cooling system for an engine. The apparatus includes an engine heat module structured to receive engine heat data, the engine heat data indicative of an amount of heat introduced into a liquid-cooled internal combustion engine; an exhaust gas recirculation (EGR) module structured to receive EGR heat data, the EGR heat data indicative of an amount of heat added to the liquid-cooled internal combustion engine system via EGR; a cabin heat module structured to receive heat loss data, the heat loss data indicative of an amount of heat loss in the liquid-cooled internal combustion engine system; a coolant temperature module structured to combine the engine heat data with the EGR heat data while subtracting out the heat loss data to determine a temperature of coolant in the liquid-cooled internal combustion engine system; and a thermostat diagnostic module structured to determine a status of a thermostat in the liquid-cooled internal combustion engine system responsive to the determined temperature of the coolant compared to a sensed temperature of the coolant. In one embodiment, the heat loss data includes an ambient air temperature. Advantageously, by taking into consideration the ambient air temperature, the apparatus substantially accounts for coolant heat losses that may be encountered during operation of the heating system for a vehicle.

Another embodiment relates to a method for determining a temperature of coolant in a cooling system for an engine and diagnosing a thermostat in the engine responsive to the determined temperature. The method includes interpreting engine heat data indicative of a first amount of heat introduced into the internal combustion engine; interpreting exhaust gas recirculation (EGR) heat data indicative of a second amount of heat introduced into the internal combustion engine via the amount of exhaust gas provided to the intake manifold; interpreting heat loss data indicative of an amount of heat loss experienced by the coolant; determining a temperature of the coolant based on the first amount of heat, the second amount of heat, and the amount of heat loss; comparing the determined temperature of the coolant to a sensed temperature of the coolant; and determining a status of the thermostat responsive to the comparison.

Still another embodiment relates to a system. The system includes an internal combustion engine having an intake manifold and an exhaust manifold; a liquid cooling system operatively coupled to the internal combustion engine, wherein the liquid cooling system includes a thermostat and is structured to circulate a coolant to the internal combustion engine; an exhaust gas recirculation (EGR) system operatively coupled to the exhaust manifold, wherein the EGR system is structured to selectively provide an amount of exhaust gas from the exhaust manifold to the intake manifold; and a controller operatively coupled to the internal combustion engine, the liquid cooling system, and the EGR system. According to one embodiment, the controller is structure to receive engine heat data indicative of a first amount of heat introduced into the internal combustion engine; receive EGR heat data indicative of a second amount of heat introduced into the internal combustion engine via the amount of exhaust gas provided to the intake manifold; receive heat loss data indicative of an amount of heat loss experienced by the coolant; determine a temperature of the coolant based on the first amount of heat, the second amount of heat, and the amount of heat loss; compare the determined temperature of the coolant to a sensed temperature of the coolant; and determine a status of the thermostat responsive to the comparison.

These and other features, together with the organization and manner of operation thereof, will become apparent from the following detailed description when taken in conjunction with the accompanying drawings.

DETAILED DESCRIPTION

Referring to the Figures generally, the various embodiments disclosed herein relate to a system and method of diagnosing a thermostat in a liquid cooling system for an internal combustion engine. According to the present disclosure and as described more fully herein, a controller is communicably coupled to the engine, exhaust gas recirculation (EGR) system, and cooling system in a vehicle. As a result, the controller is structured to receive data indicative of an ambient air temperature as well as data indicative of one or more EGR characteristics (e.g., a temperature across the EGR cooler, a pressure, a flow rate, etc.) to determine, estimate, or predict an amount of heat being added to the coolant during combustion and via the EGR system as well as heat losses by the coolant (e.g., based on the temperature of the ambient air) to diagnose the thermostat 100. Advantageously, the controller of the present disclosure facilitates a relatively more accurate diagnostic process to prevent or substantially prevent false failures for the thermostat (e.g., a stuck-open thermostat, etc.) by, at least in part, taking into consideration the outside air temperature. In conventional systems, not only is this data not considered, but as described above, the outside air temperature can have a large impact on the temperature of the coolant which can cause adverse operation of the thermostat if not properly accounted for. In turn, the systems and methods of the present disclosure provide a relatively accurate coolant temperature estimation despite environmental conditions (e.g., operation of a cabin heater as described herein) that have typically plagued operation of conventional systems. Furthermore and as a result of this relatively more accurate temperature determination, the controller of the present disclosure can also perform one or more diagnostic procedures on the thermostat. For example, in certain embodiments, the controller utilizes the determined coolant temperature in comparison to a detected coolant temperature (e.g., via a temperature sensor) to diagnose the thermostat (e.g., healthy, stuck-open, needs to be checked, replace, etc.). These and other features of the present disclosure are described more fully herein.

Figure 1:
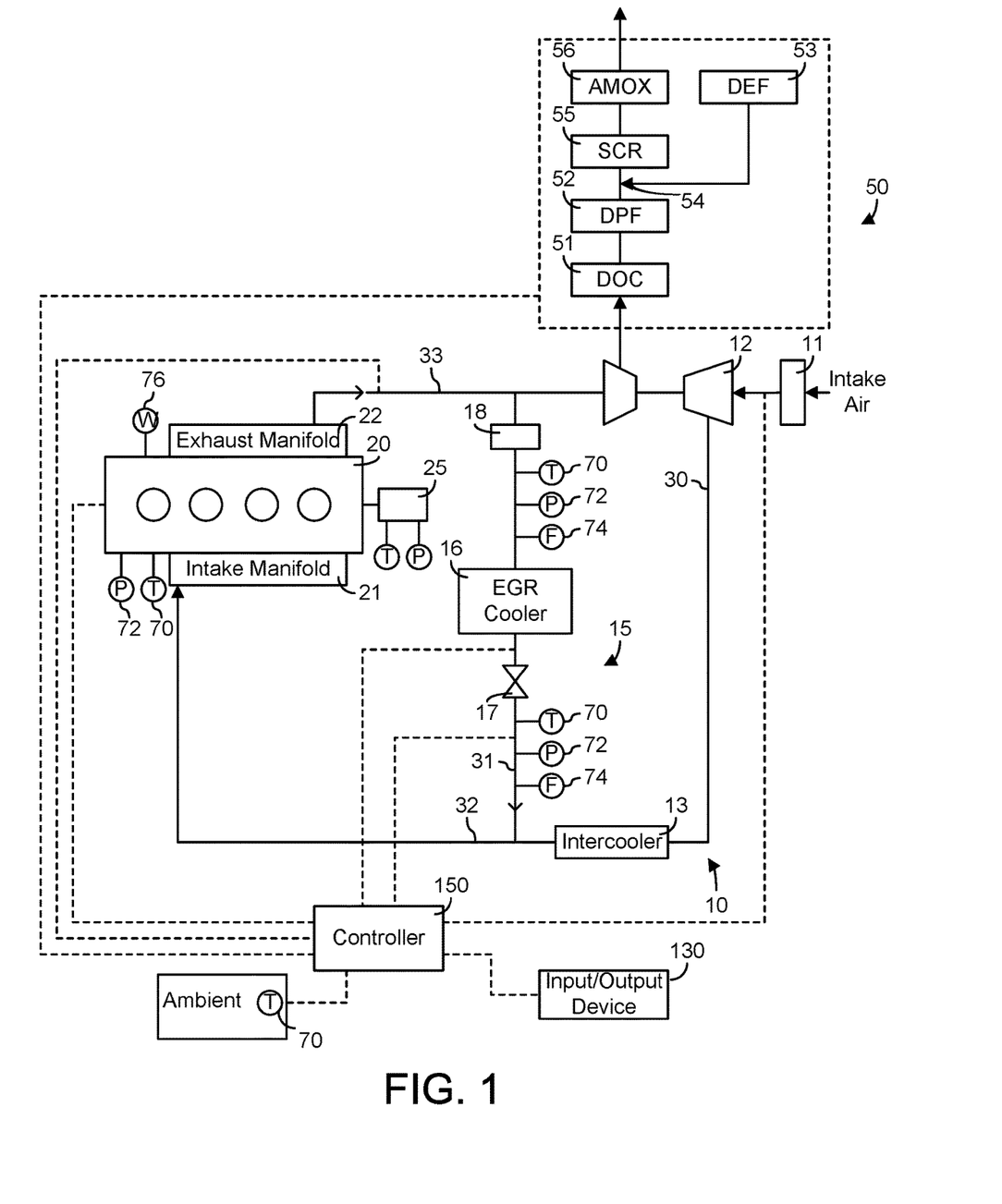
FIG. 1 is a schematic diagram of an internal combustion engine system with a controller, according to an example embodiment.

Referring now to FIG. 1, an internal combustion engine system with a controller is shown according to an example embodiment. The engine system 10 includes an internal combustion engine 20 and an exhaust aftertreatment system 50 in exhaust gas-receiving communication with the engine 20. According to one embodiment, the engine system 10 and exhaust aftertreatment system 50 are included in a vehicle. The vehicle can be an on-road or an off-road vehicle including, but not limited to, busses, line-haul trucks, mid-range trucks (e.g., pick-up truck), sedans, coupes, compacts, sport utility vehicles, and any other type of vehicle that utilizes a liquid-cooling system.

As shown generally, the engine system 10 includes a filter 11, a turbocharger 12, an intercooler 13, an exhaust gas recirculation (EGR) system 15 including an EGR cooler 16 and an EGR valve 17, and a fuel system 25 with each system in operative communication with the internal combustion engine 20. According to one embodiment, the engine 20 is structured as a compression-ignition internal combustion engine that utilizes diesel fuel. However, in various alternate embodiments, the engine 20 may be structured as any other type of engine (e.g., spark-ignition, etc.) that utilizes any type of fuel (e.g., gasoline, ethanol, e85, etc.). In some embodiments, the engine system 10 may not include an EGR system; in which case, the systems and methods described herein may approximate the heat injected through the EGR as zero. Beneficially, the systems, methods, and apparatuses described herein are then applicable with a variety of engine system configurations.

The filter 11 is structured to remove debris and/or particles from an intake air stream prior to the intake air being provided to the engine 20. The filter 11 (e.g., air filter, etc.) can have any of a variety of shapes and sizes based on the application including a variety of porosities. The turbocharger 12 includes a turbine section and a compressor section. The compressor section is structured to receive the intake air from the filter 11 and compress the intake air stream into a high pressure, low velocity air stream. The turbine section is structured to receive exhaust gas from the engine 20 and provide the exhaust gas to the aftertreatment system 50. The turbocharger 12 can include any type of turbocharger typically included in engine systems. For example, the turbocharger 12 can include, but is not limited to, a twin-turbo configuration, a twin-scroll configuration, a variable-geometry configuration, etc. It should be understood that other embodiments may exclude the turbocharger from the engine system configuration, with all such configurations intended to fall within the spirit and scope of the present disclosure.

According to the ideal gas law, by compressing the air to a high pressure, the turbocharger 12 also increases the temperature of the compressed air. As a result, the high temperature, high pressure intake air is received by an intercooler 13 (e.g., charge air cooler). The intercooler 13 is structured as a heat exchanger configured to remove heat from the compressed air before providing the compressed air to the intake manifold 21 of the engine 20. Accordingly, the intercooler 13 can include any type of intercooler typically included in engine systems such as an air-to-air intercooler and/or an air-to-liquid intercooler. The output of the intercooler 13 is the charge air used for combustion in the engine 20. It should be understood that other embodiments may exclude the charge air cooler (i.e., intercooler) from the engine system, with all such configurations intended to fall within the spirit and scope of the present disclosure The EGR system 15 is structured to recirculate exhaust gas back to the intake manifold 21 to be re-used for combustion. By routing exhaust gas back to the engine 20 for combustion, inert gases are provided for combustion which function to absorb combustion heat to reduce peak in-cylinder temperatures. Advantageously, this function works to reduce nitrous oxide ($NO_x$) emissions from the engine 20. As shown, the EGR system 15 includes an EGR orifice 18, an EGR cooler 16, and an EGR valve 17. It should be understood that this diagram is exemplary only and not meant to be limiting as many other components may be added or excluded from the EGR system 15 (as well as the engine system 10 in general). For example, the EGR orifice is an optional component as is the EGR cooler, as some configurations may not include these components. The valve 17 is selectively activated by the controller 150 and includes any type of valve typically included with EGR systems.

When the valve 17 is fully closed, exhaust gas is prevented from recirculating back to the intake manifold 21. When the valve 17 is fully or partially open, exhaust gas is permitted to recirculate back to the intake manifold 21. The EGR orifice 18 is structured as any type of EGR orifice typically included in EGR systems. The EGR orifice 18 is situated between the exhaust manifold 22 and the valve 17. Due to this positioning, a pressure drop is formed across the EGR orifice 18 whenever exhaust gas is recirculated to the intake manifold 21 (e.g., the valve 17 is open or partially open). As shown, a temperature sensor 70, pressure sensor 72, and flow sensor 74 are positioned proximate the EGR orifice 18. The temperature sensor 70, pressure sensor 72, and flow sensor 74 are communicably coupled to the controller 150 and structured to acquire and provide data indicative of a temperature, pressure, and flow of exhaust gas flowing through the EGR orifice 18 in the EGR system 15 toward the intake manifold 21.

As mentioned above, the EGR system 15 includes an EGR cooler 16 and an EGR valve 17. The EGR cooler 16 is structured as any type of heat exchanger typically included in EGR systems including, but not limited to, air-to-air and/or liquid (e.g., coolant)-to-air (e.g., exhaust gas) heat exchangers. The EGR cooler 16 is structured to remove heat from the exhaust gas prior to the exhaust gas being re-introduced into the intake manifold 21. Heat is removed from the exhaust gas prior to reintroduction to, among other reasons, prevent high intake temperatures that could promote pre-ignition (e.g., engine knock). As shown, an additional temperature sensor 70, pressure sensor 72, and flow sensor 74 are positioned after the valve 17 proximate the charge air stream. Accordingly, data indicative of the temperature, pressure, and flow of the exhaust gas entering the charge air stream (and, consequently, the intake manifold 21) can be communicated to the controller 150. Moreover, data indicative of the temperature drop as measured by the temperature sensors 70 upstream and downstream of the EGR cooler 16 may be determined and/or approximated. According to the present disclosure, the controller 150 advantageously utilizes the aforementioned EGR data to obtain an indication of the heat added to the coolant via the EGR. This may be in the form of the measured (e.g., determined, approximated, etc.) temperature drop across the EGR cooler 16, which may be indicated of the heat added to the coolant via the EGR. That is to say, the difference from exhaust temperature to EGR outlet temperature (either EGR Orifice temperature, or charge temperature) can be combined with EGR flow to measure, determine, and/or approximate the heat transfer. Because the EGR cooler 16 is a rather larger heat exchanger of exhaust gas to coolant, operation of the EGR cooler 16 (and EGR system 15 in general) can have a large impact on the temperature of the coolant.

As shown in FIG. 1, a fuel system 25 is operatively coupled to the engine 20. The fuel system 25 is structured to provide fuel to the engine 20 for combustion. Accordingly, the fuel system 25 can include a fuel pump, a fuel filter, piping to transport the fuel, temperature sensors 70, pressure sensor 72, flow sensors 74, and any other component included in fuel systems. In this regard, the controller 150 can receive data indicative of operation of the fuel system, such as a fuel pressure, fuel flow rate, etc.

With the aforementioned description in mind, operation of the engine system 10 and EGR system 15 can be described as follows. Intake air is received by the filter 11. The filter 11 (via piping, channel, conduit, etc.) guides the intake air to the turbocharger 12. The turbocharger 12 compresses the intake air. The compressed air is directed along intake air circuit 30 (e.g., piping, conduit, channel, etc.). The compressed air is received by the intercooler 13 where the intercooler removes heat from the compressed air to output charge air (the "charge" of air used for combustion). Concurrently, during operation of the engine system 10, the engine 20 emits exhaust gases. The exhaust gases are provided along an exhaust circuit 33 (e.g., channel, piping, conduit, etc.). Some of the exhaust gases are directed to the turbocharger 12 while another part are directed to the EGR system 15. The controller 150 selectively actuates the EGR system 15 (e.g., the valve 17, etc.) to direct a portion of exhaust gas along an EGR circuit 31 (e.g., piping, conduit, channel, etc.). The exhaust gas in the EGR circuit 31 flows through the orifice 18, to the EGR cooler 16, and through the valve 17. The cooled exhaust gas (from the EGR cooler 16) is then mixed or provided concurrently with the charge air. As shown, the charge air circuit 32 includes the charge air from the intercooler 13 and the cooled exhaust gas from the EGR circuit 31. The charge air including the recirculated exhaust gas is the provided to the intake manifold 21 of the engine 20 for combustion.

The engine 20 also receives a chemical energy input (e.g., fuel such as diesel, gasoline, etc.). The chemical energy or fuel is provided by the fuel system 25. The chemical energy input and the charge air exhaust gas combination are combusted within the engine 20 to generate a mechanical power output. The mechanical energy power output (e.g., a rotating crankshaft) is used to power or drive the vehicle. For example, the rotating crankshaft is received by a transmission that manipulates the crankshaft speed to obtain a desired draft shaft speed. The rotating drive shaft is received by a differential that provides the rotational energy to a final drive (e.g., wheels) of the vehicle to propel or move the vehicle.

During combustion, exhaust gases are expelled via the exhaust manifold 22 to the exhaust gas circuit 33. As mentioned above, some of the exhaust gas expelled can be provided to the EGR system 15 while some (e.g., the remaining) is provided to the turbocharger 12. When the EGR system 15 is not actuated, all of the exhaust gas is provided to the turbocharger 12. The turbocharger 12 provides the exhaust gas to an exhaust aftertreatment system 50. It should be understood that, in some embodiments, an exhaust aftertreatment system may be excluded from the configuration such that the exhaust gas is expelled via, e.g., a muffler to the environment. Accordingly, the inclusion of an exhaust aftertreatment system in FIG. 1 is not meant to be limiting.

The exhaust aftertreatment system 50 is structured to receive the exhaust gas and reduce components in the exhaust gas to less harmful compounds prior to emission of the exhaust gas into the atmosphere. As shown, the exhaust aftertreatment system includes a diesel oxidation catalyst (DOC) 51, a diesel particulate filter 52, a selective catalytic reduction (SCR) system 55, and an ammonia oxidation (AMOx) catalyst 56. The exhaust aftertreatment system 50 also includes a reductant delivery system, shown as a diesel exhaust fluid (DEF) source 53 and a doser 54 for injecting DEF into the system.

The DOC 51 can have any of various flow-through designs. Generally, the DOC 51 is structured to oxidize at least some particulate matter, e.g., the soluble organic fraction of soot, in the exhaust and reduce unburned hydrocarbons and CO in the exhaust to less environmentally harmful compounds. For example, the DOC 51 can be structured to reduce the hydrocarbon and CO concentrations in the exhaust to meet the requisite emissions standards for those components of the exhaust gas. An indirect consequence of the oxidation capabilities of the DOC 51 is the ability of the DOC to oxidize NO into $NO_2$. In this manner, the level of $NO_2$ exiting the DOC 51 is equal or substantially equal to the $NO_2$ in the exhaust gas generated by the engine 20 plus the $NO_2$ converted from NO by the DOC 51. In addition to treating the hydrocarbon and CO concentrations in the exhaust gas, the DOC 51 can also be used in the controlled regeneration of the DPF 52, SCR catalyst in the SCR system 55, and AMOx catalyst 56. In one embodiment, this can be accomplished through the injection, or dosing, of unburned HC into the exhaust gas upstream of the DOC 51. Upon contact with the DOC 51, the unburned HC undergoes an exothermic oxidation reaction which leads to an increase in the temperature of the exhaust gas exiting the DOC 51 and subsequently entering the DPF 52, SCR system 55, and/or the AMOx catalyst 56. The amount of unburned HC added to the exhaust gas is selected to achieve the desired temperature increase or target controlled regeneration temperature.

The DPF 52 can be any of various flow-through or wall-flow designs, and is structured to reduce particulate matter concentrations, e.g., soot and ash, in the exhaust gas to meet or substantially meet requisite emission standards. The DPF 52 captures particulate matter and other constituents, and thus may need to be periodically regenerated to burn off the captured constituents. Additionally, the DPF 52 may be configured to oxidize NO to form $NO_2$ independent of the DOC 51.

As shown, the SCR system 55 is in operative or fluid communication with the reductant delivery system. The reductant source 53 can be a container or tank capable of retaining a reductant, such as, for example, ammonia ($NH_3$), DEF (e.g., urea), or diesel oil. The reductant source 53 is in reductant supplying communication with the pump, which is configured to pump reductant from the reductant source to the delivery mechanism 54 via a reductant delivery line. The delivery mechanism 54 is positioned upstream of the SCR system 55. The delivery mechanism 54 is selectively controllable to inject reductant directly into the exhaust gas stream prior to entering the SCR system 55. In some embodiments, the reductant can either be ammonia or DEF, which decomposes to produce ammonia. As briefly described, the ammonia reacts with NOx in the presence of a SCR catalyst included with the SCR system 55 to reduce the NOx to less harmful emissions, such as $N_2$ and $H_2O$. The NOx in the exhaust gas stream includes $NO_2$ and NO. Generally, both $NO_2$ and NO are reduced to $N_2$ and $H_2O$ through various chemical reactions driven by the catalytic elements of the SCR catalyst in the presence of $NH_3$. The SCR catalyst included with the SCR system 55 can be any of various catalysts known in the art. For example, in some implementations, the SCR catalyst is a vanadium-based catalyst, and in other implementations, the SCR catalyst is a zeolite-based catalyst, such as a Cu-Zeolite or a Fe-Zeolite catalyst. All such variations are intended to fall within the spirit and scope of the present disclosure.

The AMOx catalyst 56 can be any of various flow-through catalysts configured to react with ammonia to produce mainly nitrogen. The AMOx catalyst 56 is structured to remove ammonia that has slipped through or exited the SCR system 55 without reacting with NOx in the exhaust. In certain instances, the exhaust aftertreatment system 50 may be operable with or without an AMOx catalyst. Further, although the AMOx catalyst 56 is shown as a separate unit from the SCR system 55 in FIG. 1, in some implementations, the AMOx catalyst may be integrated with the SCR catalyst, e.g., the AMOx catalyst and the SCR catalyst can be located within the same housing. As shown, the SCR catalyst and AMOx catalyst are positioned serially, with the SCR catalyst preceding the AMOx catalyst. As described above, in various other embodiments, the AMOx catalyst is not included in the exhaust aftertreatment system 50.

In operation, exhaust gas from the exhaust manifold 22 flows through the exhaust gas circuit 33 to the turbocharger 12, where the exhaust gas is directed to the exhaust aftertreatment system 50. The exhaust gas flows into the DOC 51 followed by the DPF 52. Subsequently, the exhaust gas flows into the SCR system 55. As the exhaust gas flows through piping into the SCR system 55, it is periodically dosed with DEF by the DEF doser 54. Accordingly, this section of exhaust piping acts as a decomposition chamber or tube to facilitate the decomposition of the DEF to ammonia. From the SCR system 55, the exhaust gas flows into the AMOx catalyst 56 and exits the AMOx catalyst into outlet piping before the exhaust gas is expelled from the exhaust aftertreatment system 50. Based on the foregoing, in the illustrated embodiment, the DOC 51 is positioned upstream of the DPF 52 and the SCR system 55, and the SCR system 55 is positioned downstream of the DPF 52 and upstream of the AMOX catalyst 56. However, in alternative embodiments, other arrangements of the components of the exhaust aftertreatment system 50 are also possible.

As shown the controller 150 is communicatively coupled to the exhaust aftertreatment system 50. The exhaust aftertreatment system 50 can include a variety of sensors, such as NOx sensors, temperature sensors, flow sensors, pressure sensors, particulate matter sensors, etc. that provide data indicative of various characteristics in the system 50. Responsive to the data, the controller 150 can run diagnostic tests and/or actuate one or more components in the system 50 (e.g., control the dosing quantity and timing, etc.).

With the engine system 10, EGR system 15, and exhaust aftertreatment system 50 generally described above, FIG. 2 depicts a schematic diagram of a cooling system 80 for the engine 20. The cooling system 80 is structured to circulate a coolant that is used in the cooling system. The cooling system 80 is also structured to maintain the temperature of the coolant substantially within a desired temperature range. As mentioned above, when the coolant is too hot or too cold, adverse consequences can occur such as engine knock, degradation of part tolerances, difficult ignition/combustion conditions, etc. In operation, the cooling system 80 circulates the coolant through a block of the engine 20 (and, in some embodiments, to other locations within the vehicle as well). The coolant absorbs heat from combustion to maintain the temperature of the engine 20 at or substantially within a desired temperature range. The coolant can be configured as any type of coolant typically used in engine cooling systems. For example, the coolant can include, but is not limited to, water, an ethylene glycol, a propylene glycol, etc. Generally speaking and as shown, the cooling system 80 includes a radiator 81, a radiator cap 82, a fan 83, a pump 84, a coolant circuit 85 for the coolant, a reserve tank 86, and a thermostat 100.

Figure 2:
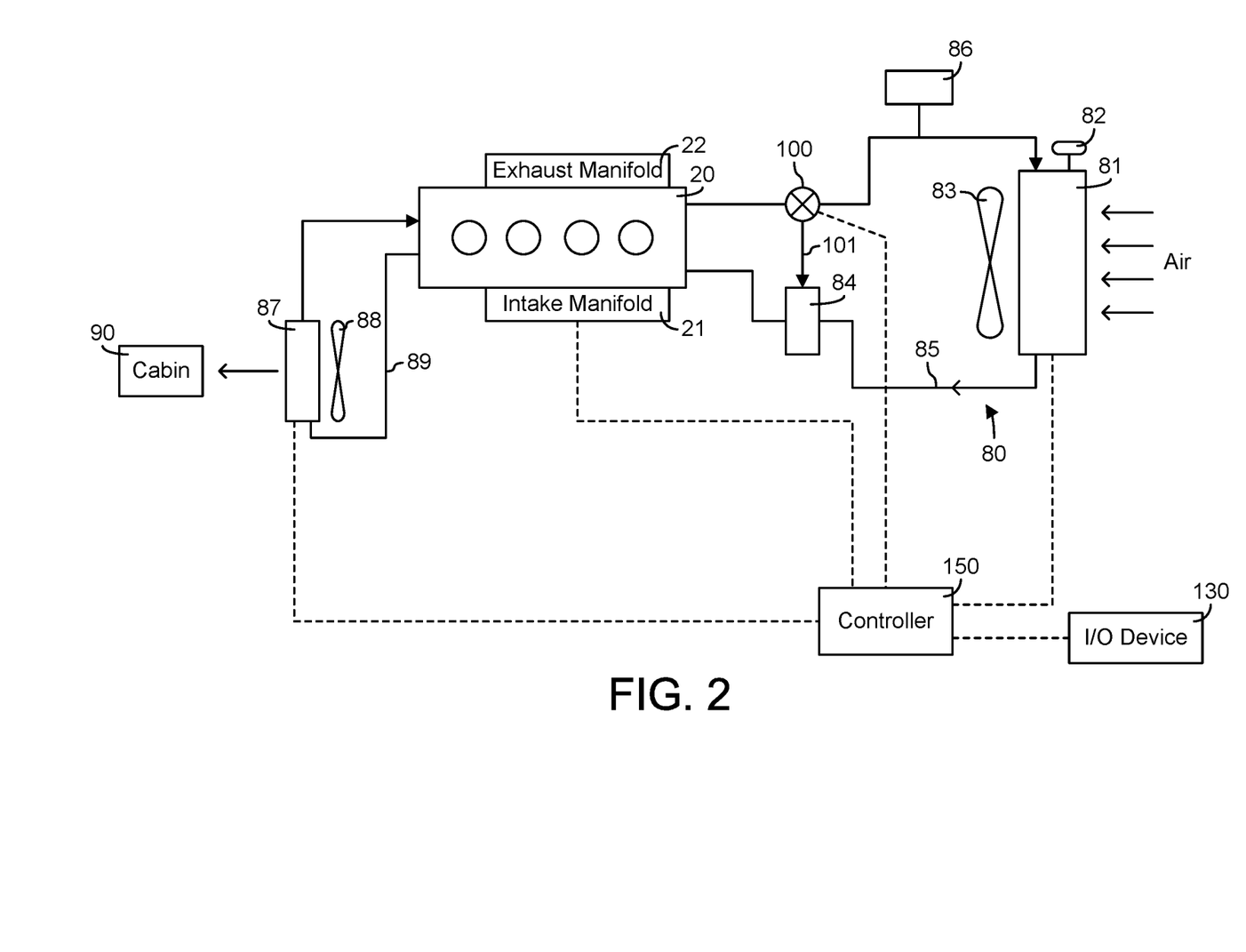
FIG. 2 is a schematic diagram of a liquid cooling system for the internal combustion engine system of FIG. 1 with the controller, according to an example embodiment.

The pump 84 is structured as any type of pump typically used in cooling systems. Accordingly, the pump can be configured as a centrifugal, non-fixed displacement type pump, or any other type pump. In one embodiment, the pump 84 is driven by the engine 20 (e.g., via a belt, etc.). In another embodiment, the pump 84 is electrically-powered (e.g., via one or more batteries included with the vehicle). The pump 84 provides the motive force to circulate the coolant throughout the cooling system 80.

The radiator 81 is operatively coupled to a fan 83 and a radiator cap 82. The radiator cap 82 or pressure cap is structured to maintain a pressure in the cooling system 80 and selectively open or rise to provide a pressure release if the pressure in the system exceeds a predetermined threshold. In operation, coolant flows through the radiator 81 where the heat absorbed from the engine is removed. Accordingly, the radiator 81 is structured as a heat exchanger for the coolant. The radiator 81 can be configured as any type of heat exchanging structure typically used in cooling systems for engines. When the pressure is released, coolant can be released from the system. Accordingly, a reserve tank 86 for coolant can be fluidly coupled to the circuit 85 to provide additional coolant as needed. The fan 83 can be positioned in front (proximate the engine system 10) of the radiator 81, like shown, or in back of the radiator 81. In this regard, the fan 83 can be configured as a "puller" (in front of the radiator) or a "pusher" (in back of the radiator 81). The fan 83 facilitates and provides air movement across the radiator 81 in order to remove heat from the coolant flowing through the radiator 81. The fan 83 or fans (e.g., some embodiments can include multiple fans) can be controlled (e.g., on/off, speed, etc.) by the controller 150 responsive temperature data indicative of the temperature of the coolant flowing through the radiator 81. In other embodiments, the fan or fans could be controller by any other controller (e.g., by the vehicle) in the system.

As shown in the example configuration of FIG. 2, a heating system is in fluid communication with the engine 20 and cooling system 80. The heating system is structured to receive the heated coolant from the engine 20 in a heating circuit 89 (e.g., conduit, piping, hoses, channels, etc.) and direct the heated coolant through a heater core 87. A fan 88 or blower is then used to direct air through the heater core 87. As the air passes over the heater core 87, the air absorbs heat. The heated air is provided to a cabin 90 of the vehicle to heat the interior of the vehicle. The coolant that passes through the heater core 87 is then re-directed back to the engine 20.

In FIG. 2, the thermostat 100 is positioned between the engine 20 and the radiator 81. Accordingly, while the thermostat 100 is positioned away from the pump 84 in this diagram, it should be understood that the thermostat 100 can be positioned in a variety of locations relative to the radiator 81, engine 20, and other components of the cooling system 80 (e.g., in a serial manner directly after the pump 84 where "after" indicates a downstream position proximate the engine 20). Accordingly, this depiction is not meant to be limiting, such that many other positions are possible with all such configurations intended to fall within the spirit and scope of the present disclosure.

The thermostat 100 is structured as any type of thermostat typically used in engine cooling systems. Accordingly, the thermostat may include a heat-activated valve: when the temperature of the coolant is detected to be at or above a certain threshold, the thermostat or valve opens to permit the coolant to flow to the radiator to release heat (i.e., cool the coolant); when the temperature of the coolant is detected to be at or below a certain cold threshold, the thermostat or valve remains closed to direct the coolant along a closed coolant circuit 101 (e.g., bypass conduit, circuit, hose, channel, pipe, etc.). In other words, in a closed position, the thermostat prevents the coolant from flowing back to the radiator 81 while in an open or partially open position, the thermostat 100 permits coolant to flow back to the radiator 81. For example, the thermostat 100 may include a tuned wax core that forces an inner plunger to push out against a spring when the wax heats and melts to open the valve and when the wax cools, the spring overcomes the plunger force to close the valve. It should be understood that the thermostat 100 can have a variety of open and close temperature thresholds.

Due to this function, the thermostat 100 can have a variety of failure modes. For example, a stuck open thermostat can decrease the coolant temperature to an undesired low temperature while a stuck close thermostat prevents the coolant from properly dissipating heat from the engine. Similarly, a leaky thermostat (or thermostat housing) can also develop which adversely impacts the pressure in the piping in the cooling system. Further, current state of the art diagnostics for thermostat failure have proven incompatible on systems with very large capacity heat exchangers attached on the engine-side of the thermostat (as opposed to the post-thermostat side such as the radiator). These loads appear to the diagnostics as a leaking thermostat, and cause false failures to be detected. Moreover, as mentioned above, a challenging situation exists in systems which employ large heat exchangers that are not isolated by mechanical thermostats. For example, urban on-highway bus applications exemplify this scenario, where large capacity coolant to cabin air heat exchangers are employed to heat the passenger cabin in cold weather. Because this heat exchange causes coolant temperature to mimic the signature of a system with a failed-open thermostat, current diagnostics are incapable of distinguishing this scenario from a hardware failure. According to the present disclosure and described more fully herein, the controller 150 receives data indicative of an ambient air temperature as well as data indicative of one or more EGR characteristics (e.g., a temperature, a pressure, a flow rate, etc.) to determine, estimate, or predict an amount of heat being added to the coolant during combustion and via the EGR system as well as expected heat losses by the coolant (e.g., based on the temperature of the ambient air) to diagnose the thermostat 100.

As the components of FIGS. 1-2 may be embodied in a vehicle, the controller 150 can be structured as an electronic control module (ECM). The ECM may include a transmission control unit and any other vehicle control unit (e.g., exhaust aftertreatment control unit, powertrain control module, engine control module, etc.). The function and structure of the controller 150 are described more fully in regard to FIG. 3.

Figure 3:
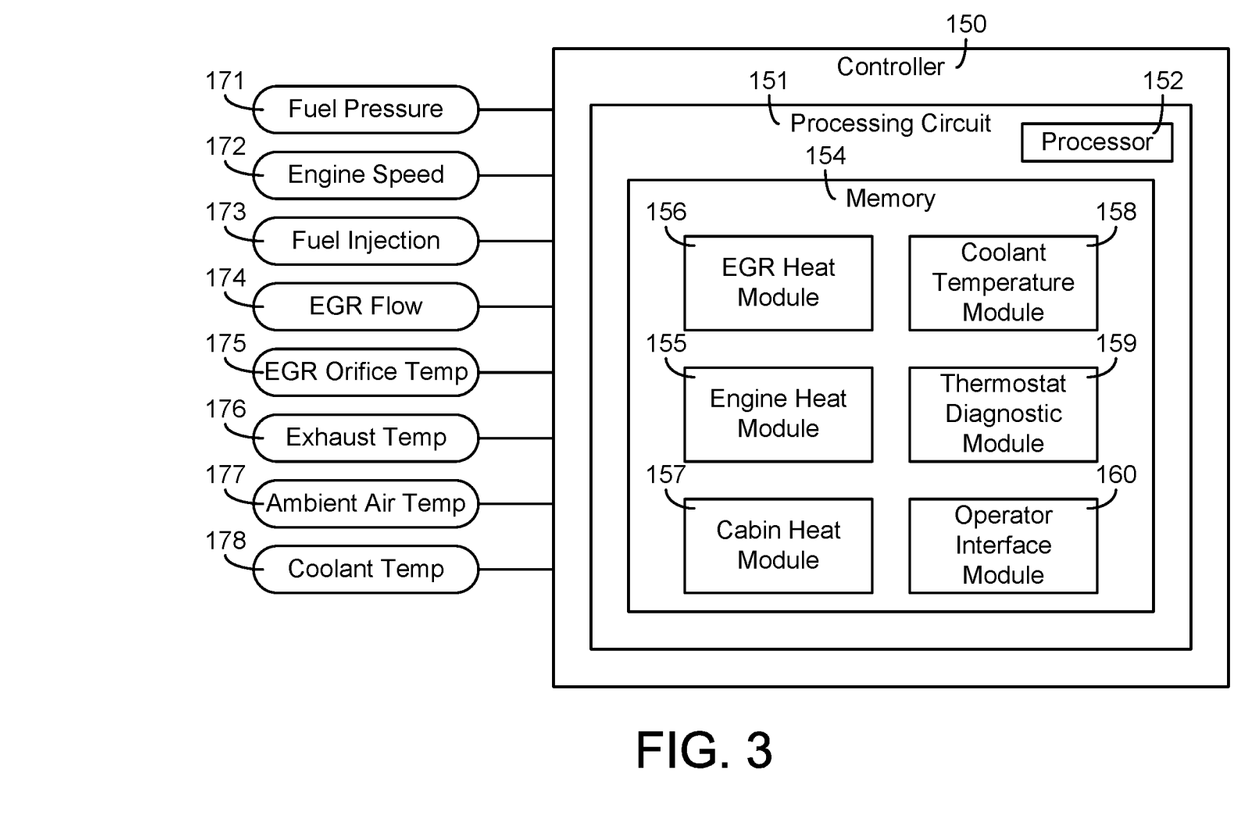
FIG. 3 is a schematic diagram of the controller used with the systems of FIGS. 1-2, according to an example embodiment.

Referring now to FIG. 3, the function and structure of the controller 150 are shown according to an example embodiment. Before turning to particular structure FIG. 3, as shown in FIGS. 1-2, the controller 150 is communicably coupled to a variety of components within each system. Accordingly, data exchange and communication between and among the components of the systems and the controller 150 can be via any number of wired or wireless connections. For example, a wired connection can include a serial cable, a fiber optic cable, a CAT5 cable, or any other form of wired connection. In comparison, a wireless connection can include the Internet, Wi-Fi, cellular, radio, etc. In one embodiment, a controller area network (CAN) bus provides the exchange of signals, information, and/or data. The CAN bus includes any number of wired and wireless connections. Because the controller 150 is communicably coupled to the systems and components of FIGS. 1-2, the controller 150 is structured to receive/interpret data from one or more of the components shown in FIGS. 1-2. For example, the data may include engine heat data (e.g., a fuel pressure, an engine speed, a fuel injection timing, etc.) received via one or more sensors, such as temperature sensor 70, pressure sensor 72 and speed sensor 76 (see FIG. 1). As described more fully herein, with this data, the controller 150 determines the amount of heat added to and dissipated from the coolant.

The controller 150 is shown to include a processing circuit 151 including a processor 152 and a memory 154. The processor 152 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 154 (e.g., NVRAM, RAM, ROM, Flash Memory, hard disk storage, etc.) may store data and/or computer code for facilitating the various processes described herein. Thus, the one or more memory devices 154 may be communicably connected to the processor 152 and provide computer code or instructions to the processor 152 for executing the processes described in regard to the controller 150 herein. Moreover, the one or more memory devices 154 may be or include tangible, non-transient volatile memory or non-volatile memory. Accordingly, the one or more memory devices 154 may include database components, object code components, script components, or any other type of information structure for supporting the various activities and information structures described herein.

The memory 154 is shown to include various modules for completing the activities described herein. More particularly, the memory 154 includes modules configured to selectively adjust one or more cruise control parameters of a vehicle. While various modules with particular functionality are shown in FIG. 3, it should be understood that the controller 150 and memory 154 may include any number of modules for completing the functions described herein. For example, the activities of multiple modules may be combined as a single module, as additional modules with additional functionality may be included, etc. Further, it should be understood that the controller 150 may further control other vehicle activity beyond the scope of the present disclosure.

Certain operations of the controller 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

As shown in FIG. 2, the controller 150 includes an engine heat module 155, an EGR heat module 156, a cabin heat module 157, a coolant temperature module 158, a thermostat diagnostic module 159, and an operator interface module 160. The operator interface module 155 may include or be communicably coupled to the operator I/O device 130 and is structured to receive one or more inputs from an operator, passenger, or other user in the vehicle. The operator input/output (I/O) device 130 enables an operator of the vehicle (or another passenger) to communicate with the vehicle and the controller 150; that is to say, the I/O device 130 facilitates communication between an operator and the controller 150 such that data can be exchanged via the I/O device 130. Accordingly, the operator I/O device 130 can include, but is not limited, an interactive display, a touchscreen device, one or more buttons and switches, voice command receivers, etc. In this regard and as described below, the operator I/O device 130 can provide the status of the thermostat based on the functions of the modules included with the controller 150 (e.g., a check thermostat lamp/light, an indicator lamp indicating that the thermostat appears to be working properly, etc.). Further, as described below, an operator can predefine one or more parameters used in the operations described below (e.g., a constant heat loss term, etc.).

The engine heat module 155, the EGR heat module 156, the cabin heat module 157, and the coolant temperature module 158 are described in regard to their ability to determine an amount of heat. The "amount of heat" refers to the kinetic energy determined, estimated, or predicted that is added to or removed from the coolant. For example, in one embodiment, the amount of heat can be based on a degree scale. For example, if the amount of heat introduced by the engine heat data is one-hundred fifty degrees Fahrenheit (150° F.), this indicates that the coolant is expected, predicted, or determined to receive, via a heat exchange relationship, 150° F. in heat. In another example, the amount of heat can be based on a gradient between the determined amount of heat and a sensed or detected coolant temperature. For example, if the detected coolant temperature was X degrees and the engine heat data indicates X+100 degrees of heat added, a gradient of one-hundred (100) degrees exists. Each of the engine heat module 155, the EGR heat module 156, the cabin heat module 157, and the coolant temperature module 158 can then utilize one or more formulas, algorithms, processes, methods, calculations, and the like to determine, estimate, or predict how much the coolant temperature 178 is expected to rise based on the positive one-hundred (100) degree difference. In still another example, the amount of heat can be based on an energy scale (e.g., British thermal units, calories, etc.). In this regard, the controller 150 can determine, calculate, estimate, etc. the temperature rise or fall of the coolant responsive to the determined added and removed amounts of heat. As can be appreciated from above, many different processes can be used by the modules of the controller 150 to determine or predict how the coolant temperature will react based on various operating conditions. As can be appreciated, many other processes are also contemplated, with all such additional processes intended to fall within the spirit and scope of the present disclosure.

With the above in mind, the engine heat module 155 is structured to receive engine heat data. Responsive to the engine heat data, the engine heat module 155 is structured to determine an amount of heat added to the coolant via operation of the engine 20. Accordingly, the engine heat data is indicative of an amount of heat introduced into a liquid-cooled internal combustion engine, such as engine 20. More particularly, the engine heat data provides an indication of the amount of heat introduced into the coolant during operation of the engine 20. Accordingly, the engine heat data includes, but is not limited to, a fuel pressure 171, an engine speed 172, fuel injection 173 information (timing, quantity, etc.), combustion temperatures from each of the cylinders of the engine, a temperature of the block of the engine 20 during operation, etc. The engine heat data can be acquired via one or more sensors operatively placed in the engine system 10 or determined (e.g., estimated, predicted, etc.) via one or more processes (e.g., formulas, algorithms, etc.). For example, as shown in FIG. 1, a temperature sensor 70, pressure sensor 72, and speed sensor 76 are operatively included with the engine 20. As also shown, the fuel system 25 for the engine 20 can also include one or more pressure, temperature, and flow sensors for acquiring the fuel pressure 171 and fuel injection 173 information. Using the engine heat data, the engine heat module 155 is structured to determine, estimate, predict, etc. the heat of combustion that is expected, predicted, determined, etc. based on the fueling parameters and engine speed. That is to say, the fuel pressure 171, engine speed 172, and fuel injection 173 parameters provide data indicative of a combustion temperature. Consequently, the engine heat module 155 can determine the amount of heat expected, determined, predicted, estimated, etc. to be added to the coolant. To facilitate a relatively faster determination of the amount of heat determined to be added to the coolant, the engine heat module 155 can use a look-up table (or a model) that cross-references values obtained engine heat data with an amount of heat determined to be added to the coolant.

In another embodiment, the engine speed data can be replaced by a pump speed where the pump speed is indicative of the speed of the pump 84 in the cooling system 80. Coolant flow is directly related to pump speed. In some configurations, the engine 20 drives the pump 84. In these configurations, the engine speed can be used to determine a flow rate of the coolant by the pump. In another embodiment, the pump 84 is electrically driven. In this embodiment, a direct speed measurement that is indicative of the pump speed may be used to determine or estimate a flow rate of the coolant. All such variations are intended to fall within the spirit and scope of the present disclosure.

In still another embodiment, an assumption can be made of the coolant flow as either a constant value or as a function of some sensed or estimated input (e.g., ambient temperature, coolant temperature, etc.). This assumption may be utilized in the case of an external coolant pump, or an electric coolant pump, where speed may not be measured. Advantageously, the controller 150 may therefore estimate, determined, and/or predict the heat added to the coolant in a variety of engine system configurations.

The EGR module 156 is structured to receive EGR heat data. Responsive to the EGR heat data, the EGR module 156 is structured to determine an amount of heat added to the coolant via EGR. Accordingly, the EGR heat data is indicative of an amount of heat added to the liquid-cooled internal combustion engine system via EGR. More particularly, the EGR heat data is data indicative of an amount of heat added to the coolant via exhaust gas recirculated back to the intake manifold 21 for combustion. The EGR heat data can include, but is not limited to, an EGR flow rate 174, an EGR orifice temperature 175, an exhaust gas temperature 176, etc. As shown in FIG. 1, a variety of temperature 70, pressure 72, and flow 74 sensors are positioned within the EGR system 15. In one embodiment, the temperature sensor 70, pressure sensor 72, and flow sensor 74 are positioned proximate the charge air circuit 32. In this regard, the temperature 70, pressure 72, and flow 74 are representative of the temperature, pressure, and flow of the exhaust gas recirculated back into the charge air stream. In other embodiments, to avoid modification of an existing system and provide modularity, the temperature, pressure, and/or flow can be acquired via existing sensors in the EGR system, regardless of their placement. In this regard, some EGR systems may not include all the type of sensors listed above. In this configuration, the controller 150 can utilize the data that is available to determine an estimate of the heat added to the coolant via the EGR. It is important to note that many different processes can be used to model the functionality of the EGR module 156 (and the engine heat module 155) with such processes intended to fall within the spirit and scope of the present disclosure.

Thus, the engine heat module 155 and the EGR module 156 determine the heat expected, predicted, and/or determined to be added to the coolant. But, due to insulation losses, heater core losses, temperature gradient losses (with respect to the ambient air), this heat estimate can be inaccurate. Therefore, the cabin heat module 157 is structured to receive heat loss data. Responsive to the heat loss data, the cabin heat module 157 is structured to determine, estimate, predict, etc. an amount of heat expected to be removed from the coolant. Accordingly, the heat loss data is indicative of an amount of heat loss in the liquid-cooled internal combustion engine system. More particularly, the heat loss data is indicative of an amount of heat loss expected, predicted, or determined to be lost by the coolant.

According to one embodiment, the heat loss data includes an ambient air temperature 177. This is depicted in FIG. 2 with the cabin 90 and temperature sensor 70. In FIG. 1, this is depicted with the temperature sensor 70 in an ambient environment. In this regard, the cabin heat module 157 can be communicably coupled to the temperature sensor 70, or temperature sensors, in the cabin 90 of the vehicle to receive temperature data indicative of the outside, ambient air temperature. In other embodiments, the ambient air temperature 177 can be communicated to the controller 150 via other means (e.g., via satellite, an input from an operator via I/O device 130, etc.). All such variations are intended to fall within the spirit and scope of the present disclosure.

As mentioned above, a problem of conventional diagnostics is that heat exchangers, such as the heater core 87, extract heat from the coolant to cool the cabin in cold ambient temperatures, which is not accounted for by the conventional systems and diagnostics. Particularly, this heat loss causes the coolant temperature to mimic a system with a failed-open thermostat. According to the present disclosure, the cabin heat module 157 utilizes the ambient air temperature 177 to determine, predict, or estimate a heat loss that can be experienced by the coolant responsive to the ambient air temperature. As the ambient air temperature decreases, the heater core 87 increases uses, and the expected heat loss increases. Advantageously, the controller 150 is adaptable and structured to respond to the environmental conditions that the vehicle currently experiences. This increases the accuracy of the determined temperature (described below) of the coolant to enable more accurate diagnostic and prognostic procedures.

In one embodiment, the cabin heat module 157 uses a constant function to determine the heat loss expected based on the ambient air temperature 177. For example, a look-up table can be used that has, in one column, an ambient air temperature and, in another column, an expected heat loss. As a constant function, the heat loss value can increase linearly with decreasing ambient air temperatures.

In another embodiment, the cabin heat module 157 uses a variable function to determine the heat loss based on the ambient air temperature 177. For example, the cabin heat module 157 can utilize various temperature ranges, such as a cold ambient air temperature range or cold air threshold, a normal ambient air temperature range, and a warm ambient air temperature range or warm air threshold. If the ambient air temperature 177 falls within the cold ambient air temperature range or below the cold air threshold, the cabin heat module 157 uses a relatively larger heat loss value than if the air temperature 177 falls within the ambient air temperature range or warm ambient air temperature threshold. In this configuration, the cabin heat loss module 157 uses a step-function.

Responsive to the amounts of heat added to the coolant determined by the engine heat module 155 and the EGR heat module 156 while subtracting the amount of heat determined by the cabin heat module 157, the coolant temperature module 158 is structured to determine a temperature of coolant 178 in the liquid-cooled internal combustion engine system. An example formulation is provided below in equation (1):

$$[\text{Engine Heat Added}]+[\text{EGR Heat Added}]-[\text{Heat Loss}]=\text{Coolant Temperature} \quad (1)$$

As shown in equation (1), "[engine heat added]" represents the added value determined by the engine heat module 155, "[EGR heat added]" represents the added heat value as determined by the EGR heat module 156, and "[heat loss]" represents the amount of heat expected to be lost by the coolant as determined by the cabin heat module 157.

According to one embodiment, the "[heat loss]" term is scaled down by the coolant temperature module 158 to reduce the heat rise based on coolant temperature to account for Newton's Law of Cooling (i.e., cold things, such as cold coolant, appear to warm up faster than warm things). As such, as the coolant temperature increases, the coolant temperature module 158 is structured to expect the coolant temperature to increase less and less as the coolant temperature increases for a given amount of heat input.

As mentioned above, to determine the coolant temperature 178, the coolant temperature module 158 can use a variety of formulations that represent the heat added/lost to the coolant. In one embodiment, a sensed or detected temperature value of the coolant is used as a reference temperature. This reference temperature can be taken when the vehicle is initially started. Then, the coolant temperature module 158 can determine (based on the determinations of modules 155-157), the expected increase or decrease relative to the reference temperature. In another example embodiment, the coolant temperature module 158 can use the ambient temperature as representative of the coolant temperature (i.e., to be the reference temperature without an initial measurement). In still a further example embodiment, a user or operator can input a reference temperature for the coolant (e.g., via the I/O device 130).

In some embodiments, the coolant temperature module 158 can determine the estimated, predicted, or expected coolant temperature without the use of a reference temperature. For example, based on the heat added and lost, the coolant temperature module 158 can use the determinations independent of a reference temperature to determine the coolant temperature. Thus, the coolant temperature module 158 may determine, estimate, or approximate the temperature of the coolant without utilizing a direct measurement. In this regard, the determined coolant temperature can be used by the thermostat diagnostic module 159 to determine a status of the thermostat.

With the above in mind, those of ordinary skill in the art will appreciate that many example coolant temperature formulations may be used. An explicit example of one such formulation is shown below:

$$\text{Predicted Coolant Temperature Rise} = \left( \text{Newtonian Coefficient} - \left( \frac{\text{Initial Coolant Temperature}}{\text{Warmed-up Engine Coolant Temperature}} \right) \right) * \\ (\text{Heat Rejection In-Cylinder} + \\ \frac{\text{Heat Rejection in EGR Cooler}}{\text{Coolant Flow}} * \\ \text{Scaling Factor} - \text{Linear Factor} \quad (2)$$

In Equation (2), the "scaling factor" is based on the ambient air temperature while the "linear factor" is also based on the ambient air temperature. Further, Equation (2) is based on using an initial coolant temperature (e.g., the reference temperature such as a sensed temperature). Moreover, in Equation (2), engine speed may be used to estimate "Coolant Flow" because, in one embodiment, they are directly proportional. In other embodiments, other estimates/determinations may be used for the term "Coolant Flow" (e.g., an actual flow measuring device may be used, a formula may be used to estimate coolant flow, etc.).

The "Heat Rejection In-Cylinder" term may be determined by Equation (3) below:

$$\text{Heat Rejection In-Cylinder}=a*x^b \quad (3)$$

In Equation (3), "x" indicates engine torque multiplied with engine speed, which can also indicated by power. Beneficially, using engine speed accounts for the fairly linear relationship with water pump flow that drives the coolant (i.e., many water pumps are belt-driven from the crankshaft).

The "Heat Rejection in EGR Cooler" may be determined by Equation (4) below:

$$\text{Heat Rejection in EGR Cooler}=\text{EGR Flow}*(\text{Exhaust Temperature}-\text{EGR Orifice Temperature}) \quad (4)$$

In Equation (4), the coolant temperature module 158 is determining the temperature drop across the EGR and multiplying that drop by the flow rate of EGR. In this regard, Equation (4) represents a BTU determination.

As mentioned above, Equations (2)-(4) represent a sample methodology in determining or estimating coolant temperature. Other embodiments may use different methodologies including more or less steps and terms. All such variations are intended to fall within the spirit and scope of the present disclosure.

The thermostat diagnostic module 159 is structured to determine a status of a thermostat, such as thermostat 100. The status can include any one of a variety of diagnostic statuses. For example, the status can be general such as healthy or not-healthy, which can be provided via the I/O device 130. In another embodiment, the status can be specific such as stuck-open thermostat, stuck-close thermostat, check thermostat, replace thermostat, and healthy or good thermostat. As described below, the determination of these statuses can be based on the comparison of the determined coolant temperature.

In one embodiment, the thermostat diagnostic module 159 is structured to compare the determined coolant temperature to a sensed or measured coolant temperature. For example, the controller 150 can also receive measured or sensed coolant temperature data from a temperature sensor (e.g., temperature sensor 70) positioned in a variety of locations in the engine system 10 and cooling system 80. In one embodiment, the sensed temperature is taken from a location measured in the engine block or in a cylinder head of the engine. In another embodiment, the sensed temperature is taken from a location in any location in the coolant line after the thermostat. All such variations are intended to fall within the scope of the present disclosure. The thermostat diagnostic module 159 can use an average of the measurements, a median value, or a temperature at a specific location (e.g., proximate the exhaust manifold 22) as the sensed coolant temperature. Based on the comparison, the thermostat diagnostic module 159 is structured to determine the status of the thermostat 100. By utilizing a direct or sensed measurement in combination with the determined measurement, Applicant has determined that a relatively more robust and accurate diagnostic is created. In this regard, Applicant has determined through experimental data that while a direct measurement of coolant temperature may be inaccurate, a simple checking of the measured temperature has been unable to determine the "health" of the thermostat. More particularly, Applicant has determined cases where a healthy thermostat is accompanied by a low sensed coolant temperature. Accordingly, the thermostat diagnostic module 159 may utilize both a sensed temperature and the determined temperature (described above) to determine a status of the thermostat.

According to one embodiment, thermostat diagnostic module 159 uses a plurality of comparisons to determine the status of the thermostat. As described below, in some instances, the thermostat diagnostic module 159 may make one or more status determinations after a predefined number of iterations (i.e., comparisons). In this arrangement, the thermostat diagnostic module 159 may make many short interim decisions, and then tally those passes and fails into a final diagnostic decision about the cooling system integrity.

If the determined coolant temperature is above the sensed value by more than a predefined amount (e.g., ten percent of the sensed value, twenty percent, or another amount specified by an operator or otherwise predefined), the thermostat diagnostic module 159 determines the thermostat is stuck-open and sends an indication to the I/O device 130 to inform the operator. In one embodiment, the thermostat diagnostic module 159 determines that the thermostat is stuck-open in response to several iterations (e.g., more than three, any number to establish a pattern, any number deemed to be sufficient by those of skill in the art, etc.) of the diagnostic determining that the sensed coolant temperature is consistently (e.g., above a preset threshold, such as seventy-percent) lower than the determined coolant temperature. In another embodiment, the thermostat diagnostic module 159 determines that the thermostat is stuck-open based on the determined coolant being greater than the sensed coolant temperature by more than a predefined amount for more than a predefined time (e.g., a number of iterations, a duration of time, some combination therewith, etc.).

If the determined coolant temperature is within a predefined range of the sensed coolant temperature, the thermostat diagnostic module 159 determines the thermostat is healthy and sends this indication to the I/O device 130. In one embodiment, the thermostat diagnostic module 159 determines the thermostat is healthy based on either of i) several iterations of the diagnostic (e.g., more than three, any number to establish a pattern, any number deemed to be sufficient by those of skill in the art, etc.) have determined that the sensed coolant temperature is consistently higher than the determined coolant temperature or ii) the sensed coolant temperature reached a "fully warm" state independent of the determined coolant temperature. The "fully warm" state is indicative that the coolant is removing heat from the engine in an intended fashion without becoming too warm to cause an issue (e.g., pre-mature ignition due to heat transfer from the coolant to the engine block).

If the determined coolant temperature is below the sensed value by more than a predefined amount, the thermostat diagnostic module 159 runs this diagnostic procedure again. Accordingly, in this configuration, the thermostat diagnostic module 159 determines a status of the thermostat based on the gradient of separation between the sensed value and the determined value. In a variation, the predefined amount can vary based on the sensed or measured coolant temperature. For example, cooler sensed temperatures may only permit smaller deviations to be deemed healthy while warmer sensed temperature may permit a relatively larger deviation or range relative to the sensed value to be deemed healthy by the module 159. For example, in cold conditions or during engine start-up, the coolant is expected to be nominal or cooler in temperature (closer to the ambient weather conditions). In this case, if the determined coolant temperature is above by the ambient temperature (e.g., temperature 177) by more than five percent of the ambient, the thermostat diagnostic module 159 can determine that the thermostat is stuck-open. However, because this diagnostic can be run continuously, if the sensed value is one-hundred and fifty degrees Fahrenheit (150° F.), the thermostat diagnostic module 159 may determine that the thermostat is healthy by having a determined coolant temperature within ten percent (rather than five percent) of 150° F.

In other embodiments, the status indication of the thermostat may be provided to a remote location in addition to or in place of providing the status indication to the I/O device 130. The remote device may include a service tool for a technician, a telematics server or database in a telematics environment, a cloud-based server, and/or any other remote location from the vehicle 100. Moreover, in some embodiments, the status indication may trigger a fault lamp or indicator lamp on the dashboard of the vehicle (e.g., a check engine light).

In still another embodiment, the status indication can include a recommendation. The recommendation may inform the operator of an appropriate next step. The appropriate next step may be to seek service immediately. The appropriate next step may be to seek service within a predefined time frame. The appropriate next step may be to perform the diagnostic again. The appropriate next step may be to monitor the thermostat. It should be understood that the aforementioned list is not meant to be exhaustive as the present disclosure contemplates a wide variety and other recommendations that may be provided by the thermostat diagnostic module 159.

Figure 4:
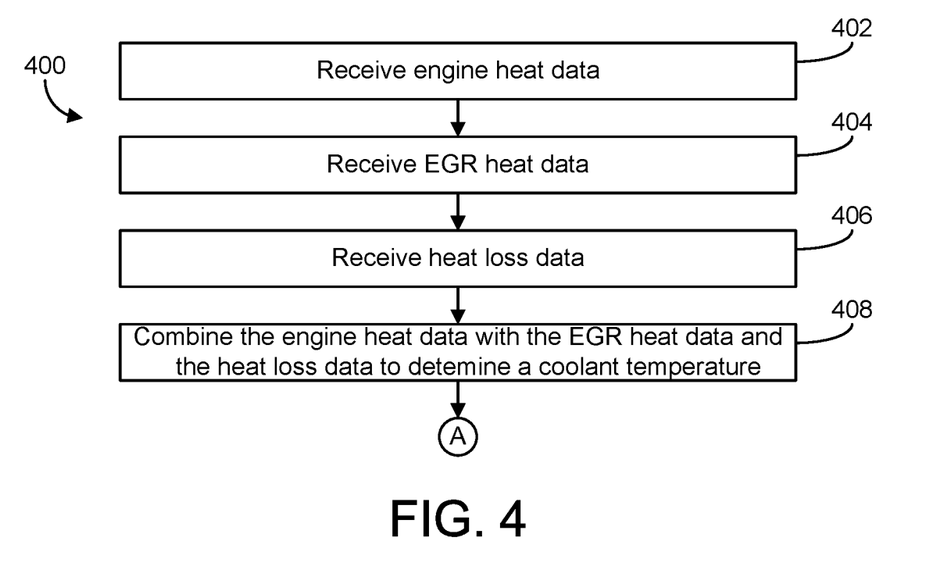
FIG. 4 is a flow diagram of a method of determining a temperature of the coolant in a liquid cooling system, according to an example embodiment.

Referring now to FIG. 4, a method 400 of determining a temperature of the coolant in a liquid-cooled internal engine system is shown according to an example embodiment. In one example embodiment, method 400 can be implemented with the controller 150 of FIGS. 1-3. Accordingly, method 400 may be described in regard to FIGS. 1-3.

At process 402, engine heat data is received. As described above, the engine heat data is indicative of an amount of heat being added to the coolant via operation of the engine. The engine heat data can include a fuel pressure, an engine speed, fuel injection information (timing, quantity, etc.), combustion temperatures from each of the cylinders of the engine, a temperature of the block of the engine during operation, etc. The engine heat data can be acquired via temperature 70, pressure 72, flow 74, and speed sensors 76. In other embodiments, the data can be determined, predicted, or estimated using other acquired data in connection with one or more look-up tables, models, algorithms, processes, etc. At process 404, EGR heat data is received, whereby the EGR heat data is indicative of an amount of heat added to the coolant via exhaust gas recirculated back to the engine for combustion. As mentioned above, the EGR heat data can include, but is not limited to, an EGR flow rate, an EGR orifice temperature, an exhaust gas temperature, etc. At process 406, heat loss data is received. In one embodiment, the heat loss data includes an ambient air temperature. Due to large temperature gradients that can exist between the coolant and the ambient air temperature, a significant amount of heat can be dissipated from the coolant which is unaccounted for in conventional systems. By considering ambient air temperature, method 400 provides an ability to estimate heat losses experienced by the coolant. In certain embodiments, the heat loss data can include any piece of data that is indicative of a heat loss configuration for the coolant. For example, due to insulation losses, a user can input via I/O device 130 a permanent heat loss of X degrees when the temperature is above a temperature threshold. In this regard, the determined heat loss includes the heat loss based on the ambient temperature and the permanent, predefined heat loss of X degrees. Accordingly, at process 408, the coolant temperature is determined based on the engine heat data, the EGR heat data, and the heat loss data. In one embodiment, the process 408 utilizes equation (1) shown above. In another embodiment, process 408 uses any other type of process including look-up tables, formulas, algorithms, models, and the like to determine an estimated temperature increase or decrease of the coolant temperature.

An example of method 400 can be described as follows. A user turns the key in their vehicle. Concurrently or shortly after, engine heat data, EGR data, and heat loss data is received by the controller 150. The controller 150 determines an amount of heat that is being or expected to be added to the coolant via the engine heat data and the EGR data. The controller 150 then determines the heat loss via the heat loss data. By using ambient air temperature, the controller 150 determines a relatively small of amount heat loss occurring in warm ambient temperatures due to the likely in-operation of the cabin heater 87. However, the controller 150 determines that relatively more heat loss is occurring in cooler ambient temperature due to the use of the cabin heater 87. Advantageously, the controller 150 now accounts for the changing environmental conditions in determining the temperature of the coolant. In this configuration, the controller 150 uses a warm temperature threshold, a cold temperature threshold, and a normal temperature range. If the ambient air temperature falls at or above the warm temperature threshold, the controller uses a predefined relatively small term for heat loss. If the ambient air temperature falls at or below the cold temperature threshold, the controller 150 uses the predefined larges value for heat loss while if the temperature falls within the normal temperature range, the controller 150 uses a heat loss term in between. This formulaic process facilitates a relatively quick determination by readily determining the heat loss term, which saves time, increases efficiency, and reduces bandwidth and memory capacity in the controller 150. However, it is contemplated that other implementations can use more detailed and complex process for modeling the heat loss value and determining the coolant temperature in general.

Figure 5:
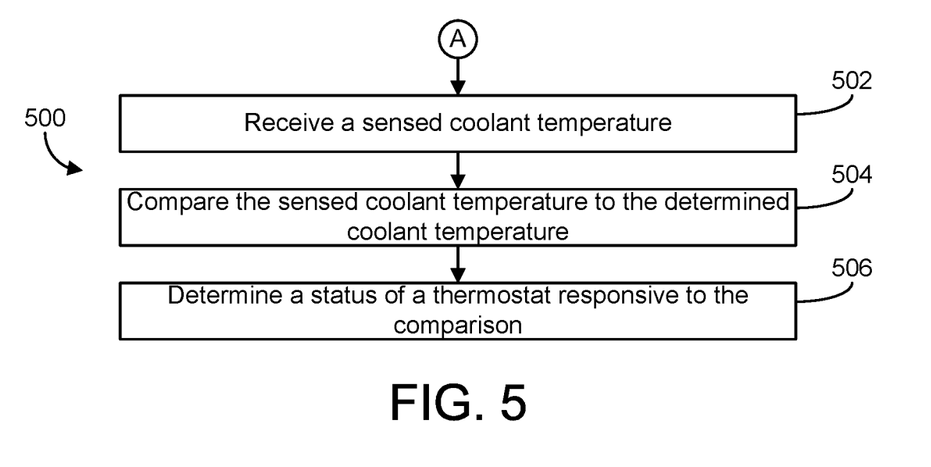
FIG. 5 is a flow diagram of a method of determining a status of a thermostat in a liquid cooling system based on the results of the method of FIG. 4, according to an example embodiment.

The determined coolant temperature from process 408 can then be used for a variety of diagnostics, prognostics, and the like. Referring now to FIG. 5, a method 500 of determining a status of the thermostat in a liquid-cooled engine is shown according to an example embodiment. Like method 400, method 500 can be implemented with the controller 150 of FIGS. 1-3. In other embodiments, methods 400-500 and the controller 150 can be implemented in a service tool operated by a technician when servicing or diagnosing thermostat. All such variations are intended to fall within the spirit and scope of the present disclosure.

At process 502, a sensed coolant temperature is received. The sensed coolant temperature refers to temperature data indicative of an actual coolant temperature. In one embodiment, the sensed coolant temperature is acquired via a temperature, such as temperature sensor 70, positioned proximate the intake manifold 21 of the engine 21. In another embodiment, the sensed coolant temperature can be acquired in any desired location in the engine 10 and cooling 80 systems. At process 504, the sensed coolant temperature is compared to the determined coolant temperature of process 408. Responsive to the comparison, at process 506, a status of the thermostat in the liquid-cooled internal combustion engine system is determined. As mentioned above, the status can include a variety of functionality indicators regarding the thermostat, such as healthy, not healthy, check, service, replace, stuck-open failure, etc. As described above, to determine the status at process 506, the controller 150 can use a variety of different processes. For example, the status can be based on the amount that separates the determined coolant temperature and the sensed temperature, and whether the determined coolant temperature is above or below the sensed temperature. Example status determinations are described herein above with regard to the thermostat diagnostic module 159.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
   a coolant temperature module structured to determine a temperature of a coolant in a liquid-cooled engine system by combining engine heat data with exhaust gas recirculation (EGR) heat data and subtracting out heat loss data from the combined engine heat data and EGR heat data, wherein the heat loss data is indicative of an amount of heat loss in the liquid-cooled engine system, wherein the heat loss data includes an ambient air temperature, and wherein the amount of heat loss is a predefined value based on the ambient air temperature; and
   a thermostat diagnostic module structured to determine a status of a thermostat in the liquid-cooled engine system responsive to the determined temperature of the coolant compared to a sensed temperature of the coolant.

2. The apparatus of claim 1, further comprising a cabin heat module, wherein the cabin heat module is structured to determine the amount of heat loss as a function of the ambient air temperature, wherein the cabin heat module determines a relatively greater amount of heat loss when the ambient air temperature is at or below a cold air threshold than when the ambient air temperature is at or above a warm air threshold.

3. The apparatus of claim 2, wherein the function includes one of a constant function or a step function.

4. The apparatus of claim 1, wherein the status is a stuck-open thermostat based on the determined temperature of the coolant being above the sensed temperature of the coolant by more than a predefined amount.

5. The apparatus of claim 1, wherein the status is a healthy thermostat based on the determined temperature of the coolant being within a predefined range of the sensed temperature of the coolant.

6. The apparatus of claim 1,
wherein the engine heat data includes data indicative of a fuel pressure, a speed of an engine in the liquid-cooled engine system, a quantity of fuel injected into the engine, and a timing of the fuel injection; and
wherein the EGR heat data includes data indicative of a flow rate of EGR into the engine, a temperature of an EGR orifice, and an exhaust gas temperature.

7. An apparatus, comprising:
a controller comprising a memory coupled to a processor, the memory storing instructions that when executed by the processor cause operations comprising:
receiving engine heat data indicative of a first amount of heat introduced into an engine;
receiving heat loss data indicative of an amount of heat loss experienced by a coolant of the engine, wherein the heat loss data includes an ambient air temperature, and wherein the amount of heat loss is a predefined value based on the ambient air temperature;
determining a temperature of the coolant based on the first amount of heat and the amount of heat loss;
comparing the determined temperature of the coolant to a sensed temperature of the coolant; and
determining a status of a thermostat responsive to the comparison.

8. The apparatus of claim 7, wherein the operations comprise receiving exhaust gas recirculation (EGR) heat data indicative of a second amount of heat introduced into the engine via a EGR system, and wherein the temperature of the coolant is determined based on the first and second amounts of heat and the amount of heat loss.

9. The apparatus of claim 7, wherein the status is a stuck-open thermostat based on the determined temperature of the coolant being above the sensed temperature of the coolant by more than a predefined amount.

10. The apparatus of claim 7, wherein the status is a healthy thermostat based on the determined temperature of the coolant being within a predefined range of the sensed temperature of the coolant.

11. The apparatus of claim 7, wherein the engine heat data includes data indicative of at least one of a fuel pressure, a speed of the engine, a quantity of fuel injected into the engine, or a timing of the fuel injection.

12. A system, comprising:
a liquid cooling system including a thermostat, the liquid cooling system structured to circulate a coolant;
a controller coupled to the liquid cooling system, wherein the controller is structured to:
receive engine heat data indicative of a first amount of heat introduced into an engine;
receive heat loss data indicative of an amount of heat loss experienced by the coolant, wherein the heat loss data includes an ambient air temperature, and wherein the amount of heat loss is a predefined value based on the ambient air temperature;
determine a temperature of the coolant based on the first amount of heat and the amount of heat loss;
compare the determined temperature of the coolant to a sensed temperature of the coolant; and
determine a status of the thermostat responsive to the comparison.

13. The system of claim 12, wherein the status is a stuck-open thermostat based on the determined temperature of the coolant being above the sensed temperature of the coolant by more than a predefined amount.

14. The system of claim 12, wherein the status is a healthy thermostat based on the determined temperature of the coolant being within a predefined range of the sensed temperature of the coolant.

15. The system of claim 12, wherein the controller is structured to provide the status to at least one of an input/output device or an indicator lamp in a vehicle.

16. The system of claim 12, wherein the controller is structure to receive exhaust gas recirculation heat data indicative of a second amount of heat introduced into the engine via an amount of exhaust gas, and wherein the controller is structured to determine the temperature of the coolant based on the first amount of heat, the second amount of heat, and the amount of heat loss.

* * * * *